United States Patent
Asada

(10) Patent No.: US 6,893,164 B2
(45) Date of Patent: May 17, 2005

(54) OPTICAL CONNECTOR AND STRUCTURE OF HOLDING AN OPTICAL FIBER CORD

(75) Inventor: Kazuhiro Asada, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 184 days.

(21) Appl. No.: 10/302,909

(22) Filed: Nov. 25, 2002

(65) Prior Publication Data

US 2003/0108303 A1 Jun. 12, 2003

(30) Foreign Application Priority Data

Nov. 26, 2001 (JP) ........................................ 2001-359300

(51) Int. Cl.⁷ ................................................. G02B 6/36
(52) U.S. Cl. ............................. 385/86; 385/77; 385/78
(58) Field of Search ............................ 385/55, 60, 66, 385/69, 72, 75, 86

(56) References Cited

U.S. PATENT DOCUMENTS

| | | | | |
|---|---|---|---|---|
| 4,762,389 A | * | 8/1988 | Kaihara | ........................ 385/60 |
| 5,452,386 A | * | 9/1995 | van Woesik | .................. 385/72 |
| 5,570,443 A | * | 10/1996 | May et al. | ...................... 385/75 |
| 6,227,721 B1 | * | 5/2001 | Naito et al. | .................... 385/78 |
| 6,641,310 B2 | * | 11/2003 | Williams | ...................... 385/92 |

FOREIGN PATENT DOCUMENTS

| | | | | |
|---|---|---|---|---|
| JP | A 10-78534 | | 3/1998 | |
| JP | 10-078534 | * | 3/1998 | ............ G02B/6/36 |

* cited by examiner

*Primary Examiner*—Kaveh Kianni
*Assistant Examiner*—Christopher M. Kalivoda
(74) *Attorney, Agent, or Firm*—Oliff & Berridge, PLC

(57) ABSTRACT

An optical connector for connecting optical fibers together in an automobile, equipment or the like. The optical connector includes a housing body portion to be connected to a mating optical connector and a bending guide portion. The housing body portion has a fiber receiving hole portion for receiving an optical fiber exposed at an end portion of an optical fiber cord. The optical fiber cord extends rearward from the fiber receiving hole portion. The bending guide portion extends rearward from the housing body portion and has a holding portion for holding the optical fiber cord in a predetermined curved manner. The optical fiber cord is positioned and held in an axial direction thereof in the bending guide portion.

13 Claims, 7 Drawing Sheets

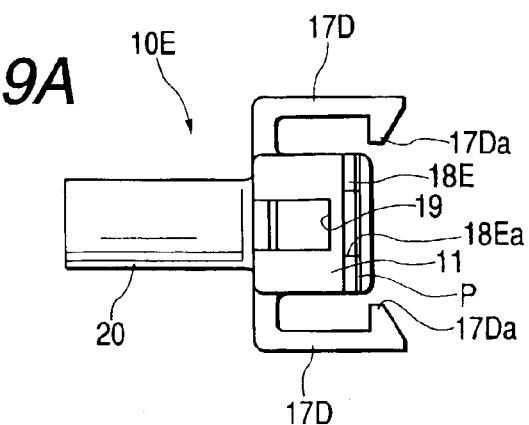
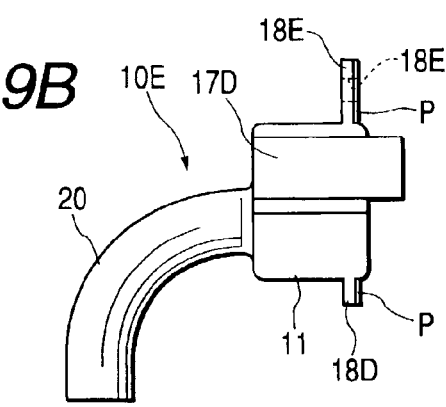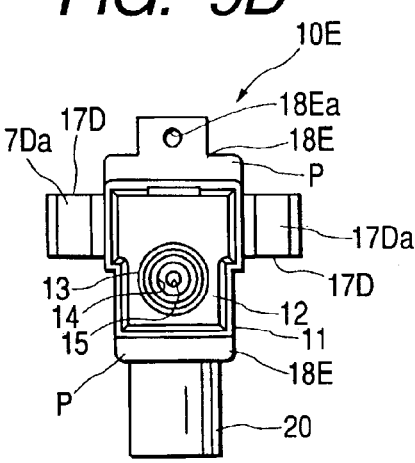
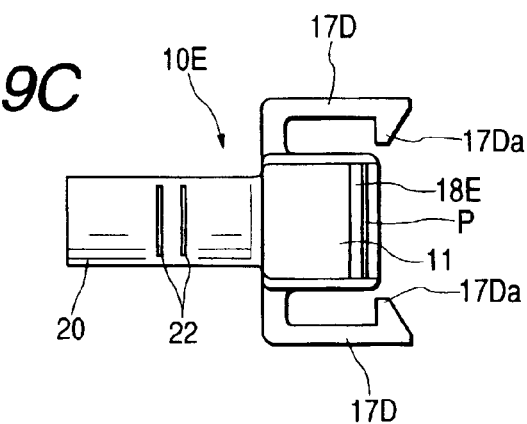

OPTICAL CONNECTOR AND STRUCTURE OF HOLDING AN OPTICAL FIBER CORD

BACKGROUND OF THE INVENTION

1. Field of the Invention

This invention relates to an optical connector for connecting optical fibers together in an automobile, equipment or the like.

2. Background Art

In a conventional optical connector, a cord insertion hole portion extends rearward from a fiber insertion hole portion (for holding an end portion of an optical fiber) in continuous relation thereto on a straight line. The optical fiber, exposed at an end portion of an optical fiber cord, is inserted in the fiber insertion hole portion, and that portion of a sheath, disposed adjacent to this exposed optical fiber, is inserted in the cord insertion hole portion, and within the cord insertion hole portion, the sheath of the optical fiber cord is positioned and held in an axial direction by the use of a stopper.

For installing an optical fiber cord, for example, within an automobile, there are occasions when this installation must be effected in such a manner that the optical fiber cord, extending outwardly from an optical connector, is bent immediately after the optical connector because of an installation space or others.

When the optical fiber is abruptly bent, a light loss much increases.

Therefore, in a conventional construction, a rubber boot, bent into a predetermined bend radius, is attached to a rear side of a connector housing, and an optical fiber cord, extending outwardly from the cord insertion hole portion, is passed through the rubber boot, and is extended to the exterior in a predetermined direction so that the optical fiber cord will not be abruptly bent.

In the above optical connector, however, the rubber boot is further provided at the rear side of the cord insertion hole portion disposed on a straight line, and therefore there has been encountered a problem that the overall construction of the optical connector becomes large in size.

SUMMARY OF THE INVENTION

It is therefore an object of this invention to provide an optical connector which can be formed into a compact size.

The above problem has been solved by an optical connector according to the invention which comprises a housing body portion having a fiber receiving hole portion for receiving an optical fiber exposed at an end portion of an optical fiber cord, the housing body portion being adapted to be connected to a mating optical connector; and a bending guide portion which extends rearward from the housing body portion, and has a holding hole portion or a holding groove portion for holding the optical fiber cord, extending rearward from the fiber receiving hole portion, in a predetermined bent form; wherein the optical fiber cord is positioned and held in an axial direction thereof by the bending guide portion.

According to the invention, a stopper insertion hole portion is formed in one of an inner peripheral portion, an outer peripheral portion and opposite side portions of the bending guide portion which have a curved shape, and a stopper is inserted into the holding hole portion or the holding groove portion through the stopper insertion hole portion, and is engaged with a sheath of the optical fiber cord.

According to the invention, the holding hole portion or the holding groove portion is substantially continuous with the fiber receiving hole portion.

According to the invention, the housing body portion and the bending guide portion are formed integrally with each other.

In a structure of holding an optical fiber cord according to the invention, the optical fiber cord is positioned and held in an axial direction thereof by the bending guide portion.

According to the invention, a lock arm portion and a positioning projection are formed on the housing body portion, and the lock arm portion has a retaining projection which is passed through a retaining hole, formed in a plate-like mounting member, to which the optical connector is to be mounted, and is retainingly engaged with one side of the plate-like mounting member, and the positioning projection is retainingly engaged with the other side of the plate-like mounting member.

According to the invention, the lock arm portion and the positioning projection project from an outer peripheral surface of the housing body portion in different directions, respectively.

According to the invention, a pair of the lock arm portions are formed on opposite side surfaces of the housing body portion, respectively, and the bending guide portion holds the optical fiber cord in such manner that the optical fiber cord is extended outward from the bending guide portion in a direction substantially perpendicular to an imaginary line interconnecting the pair of lock arm portions.

According to the invention, an elastic member is mounted on the positioning projection such that the elastic member is interposed between the positioning projection and the other side of the plate-like mounting member.

According to the invention, there is provided at least one positioning projection having a screw fastening hole for screw-fastening the positioning projection to the plate-like mounting member, and the positioning projection with the screw fastening hole projects in a direction away from a direction of extending of the optical fiber cord outwardly from the bending guide portion.

BRIEF DESCRIPTION OF THE DRAWINGS

The present invention may be more readily described with reference to the accompanying drawings; in which:

FIG. 9A is a plan view of a third embodiment of an optical connector of the invention;

FIG. 9B is a side-elevation view of the optical connector;

FIG. 9C is a rear view of the optical connector;

FIG. 9D is a front-elevation view of the optical connector;

DETAILED DESCRIPTION OF THE PREFERRED EMBODIMENTS

[First Embodiment]

A first embodiment of an optical connector of the present invention will now be described.

Figure 1:
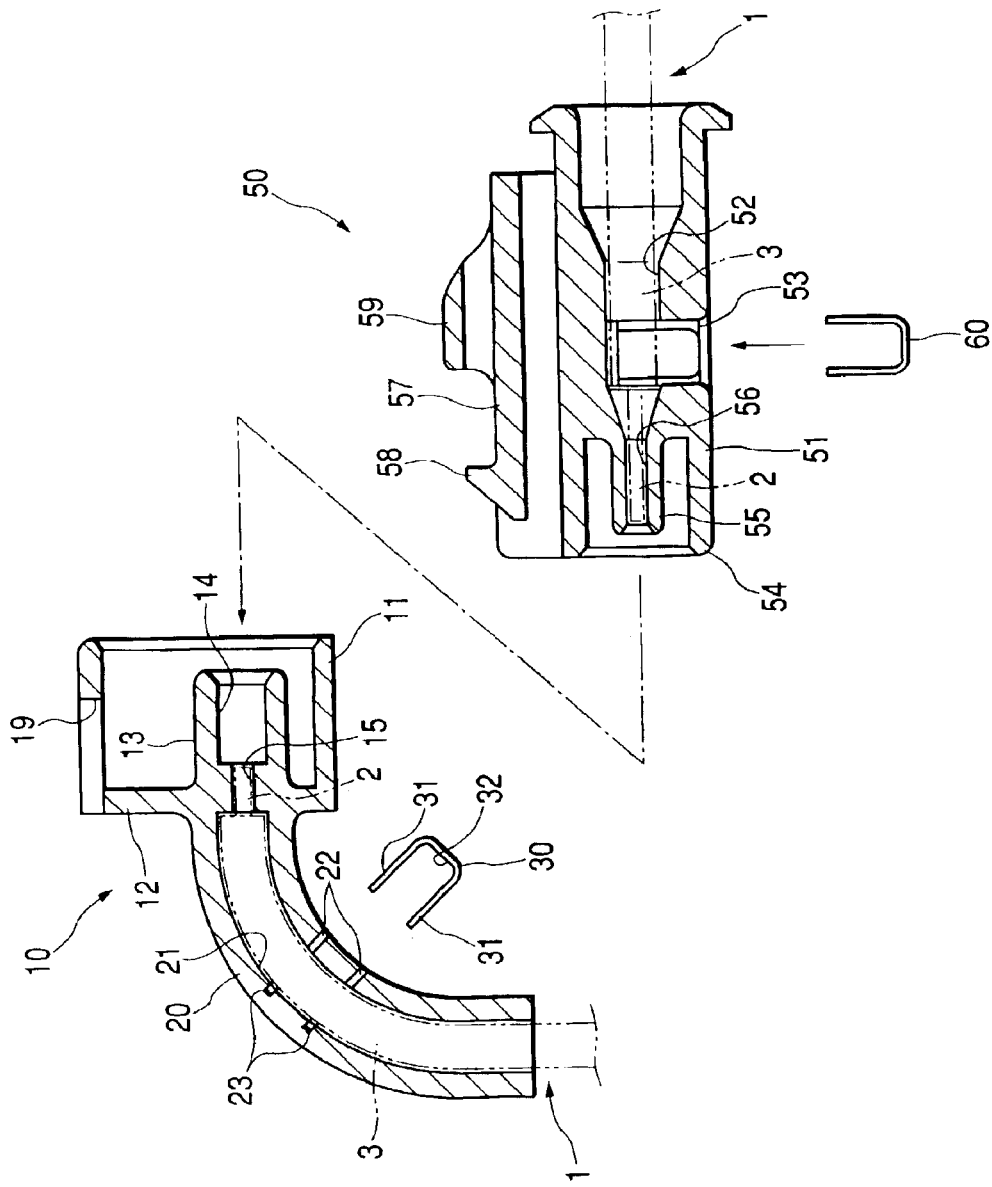
FIG. 1 is a cross-sectional view showing a first embodiment of an optical connector of the present invention and a mating optical connector.
Figure 2A:
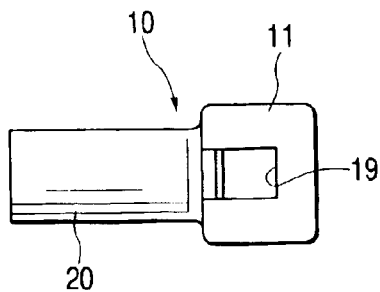
FIG. 2A is a plan view of the optical connector.
Figure 2B:
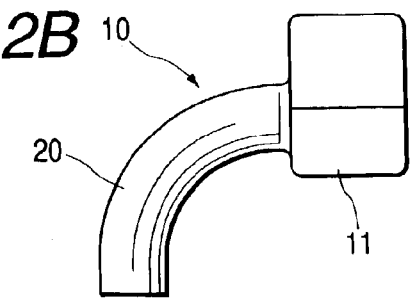
FIG. 2B is a side-elevation view of the optical connector.
Figure 2D:
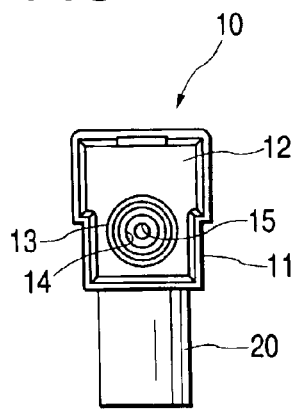
FIG. 2D is a front-elevation view of the optical connector.
Figure 2C:
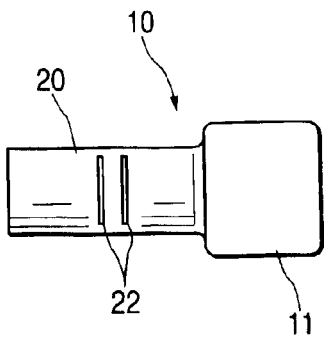
FIG. 2C is a rear view of the optical connector.

As shown in FIG. 1, this optical connector 10 holds an end portion of an optical fiber cord 1, and in this condition this optical connector can be connected to a mating optical connector 50. When the two connectors 10 and 50 are connected together, the pair of optical fiber cords 1 is optically coupled together. Namely, the two optical connectors 10 and 50 function as junction connectors for effecting a junction connection between the two optical fiber cords 1.

Referring to the mating optical connector 50, this optical connector 50 includes a housing body portion 51.

The housing body portion 51 is made of a resin or the like, and is formed into a generally tubular shape, and a cord receiving hole portion 52 for receiving and holding the optical fiber cord 1 in an axial direction thereof is formed in this housing body portion. A ferrule portion 55 of a generally cylindrical tubular shape is formed at a front end of the housing body portion 51, and a fiber receiving hole portion 56 is formed in the ferrule portion 55.

The cord receiving hole portion 52 and the fiber receiving hole portion 56 are disposed on a common straight line, and are continuous with each other. An optical fiber cord 2 is exposed over a predetermined length at the end portion of the optical fiber cord 1, and in this condition this optical fiber cord 1 is inserted into the fiber receiving hole portion 56 from the rear side of the housing body portion 51, so that the exposed end portion of the optical fiber 2 is received in the fiber receiving hole portion 56 while a sheath 3 of the optical fiber cord 1 is received in the cord receiving hole portion 52.

In this condition, the optical fiber cord 1 is held in the optical connector 50. In the optical connector 50 of this embodiment, a stopper mounting opening 53 is formed in a bottom surface (one side surface) of the housing body portion 51, and communicates with the cord receiving hole portion 52. A stopper 60 is inserted into the cord receiving hole portion 52 through this stopper mounting opening 53, and the optical fiber cord 1 is positioned and held in the axial direction thereof by this stopper 60.

More specifically, the stopper 60 is a member similar to a stopper 30 (described later), and when this stopper is inserted in a predetermined position in the cord receiving hole portion 52, positioning tooth thereof engage the sheath 3 to position and hold the optical fiber cord 1 in the axial direction thereof. The positioning and holding may be effected by other means such as an adhesive.

In this held condition of the optical fiber cord 1, the end surface of the optical fiber 2 is exposed at the distal end of the ferrule portion 55, and the end surface of the optical fiber 2 is suitably processed into a specular surface at the distal end of the ferrule portion 55.

A ferrule-protecting wall portion 54 is formed at the housing body portion 51, and surrounds the ferrule portion 55 in suitably spaced relation thereto. This ferrule-protecting wall portion 54 extends forwardly beyond the distal end of the ferrule portion 55, and serves to prevent an external member, the fingers of a person and so on from contacting the end surface of the optical fiber 2 exposed at the distal end of the ferrule portion 55.

An engagement extension piece portion 57 is formed in a cantilever manner on the upper side of the housing body portion 51, and extends from the rear end portion of this housing body portion toward the front end thereof. An engagement projection 58, which can be releasably engaged in an engagement hole portion 19 (described later) formed in the optical connector 10, is formed at a front end of the engagement extension piece portion 57. When the two optical connectors 10 and 50 are to be connected together, the engagement extension piece portion 57 is elastically deformed downwardly, so that the engagement projection 58 is engaged in the engagement hole portion 19.

A cancellation operating portion 59 is formed on an upper surface of the engagement extension piece portion 57, and when canceling the connected condition of the two optical connectors 10 and 50, the cancellation operating portion 59 is pressed down, so that the engagement of the engagement projection 58 (on the optical connector 50) in the engagement hole portion 19 in the optical connector 10 is canceled.

Referring back to the optical connector 10, this optical connector 10 includes a housing body portion 11, and a bending guide portion 20 as shown in FIGS. 1 and 2A to 2D.

The housing body portion 11 has a fiber receiving hole portion 15, and can be connected to the above mating optical connector 50.

More specifically, the housing body portion 11 is made of a resin or the like, and is formed into a generally tubular shape, and is open to a distal end (one end) thereof. The front end portion of the optical connector 50 can be fitted in the housing body portion 11 to be connected thereto.

A fiber receiving hole portion 15 for receiving an optical fiber 12 is formed through a rear end portion 12 of the housing body portion 11, and extends between front and rear sides thereof.

A ferrule guide tubular portion 13 is formed on and projects from the front side of the rear end portion 12 of the housing body portion 11 in coaxial relation to the fiber receiving hole portion 15. A ferrule guide hole portion 14, into which the ferrule portion 55 can be inserted in a guided manner, is formed in the ferrule guide tubular portion 13.

When the optical fiber 2, exposed at the end portion of the optical fiber cord 1, is inserted into the fiber receiving hole portion 15, the end surface of the optical fiber 2 is exposed at the inner end surface of the ferule guide hole portion 14. In this condition, when the ferrule portion 55 is inserted into the ferrule guide hole portion 14, the end surface of the optical fiber 2, exposed at the distal end of the ferrule portion 55, is guided toward the end surface of the optical fiber 2, exposed at the end of the ferrule receiving hole portion 15, and when the ferrule portion 55 is inserted into the deepest position, the end surfaces of the two optical fibers 2 are opposed to each other, and are optically coupled together.

The engagement hole portion 19, in which the engagement projection 58 of the optical connector 50 can be releasably engaged, is formed in an upper wall of the housing body portion 11. When the two optical connectors 10 and 50 are connected together, the engagement projection 58 is engaged in the engagement hole portion 19 to maintain this connected condition.

The bending guide portion 20 extends rearward from the housing body portion 11, and has a holding hole portion 21 for holding the optical fiber cord 1, extending rearward from the fiber receiving hole portion 15, in a predetermined bent condition.

More specifically, the bending guide portion 20 comprises a generally cylindrical tubular member which is curved into a predetermined curvature radius, and when the optical fiber cord 1 is inserted into the bending guide portion 20, this optical fiber cord is held in the predetermined bent condition corresponding to the predetermined curvature radius.

Preferably, in order to reduce a light loss as much as possible, the curvature radius of the bending guide portion 20 is larger than the minimum bend radius (which is determined in accordance with the kind of the optical fiber cord 1 and so on, and when the optical fiber cord is bent into a bend radius smaller than this minimum bend radius, the light loss increases greatly.) of the optical fiber cord 1.

The holding hole portion 21 communicates at its front end with the fiber receiving hole portion 15. When the optical fiber cord 1 is inserted into the bending guide portion 20 from the rear side thereof, the optical fiber, disposed at the end portion of the optical fiber cord 1, is guided toward the fiber receiving hole portion 15.

In this embodiment, the bending guide portion 20 is made of a resin or the like, and is formed integrally with the housing body portion 11. The housing body portion 11 and the bending guide portion 20 do not always need to be formed integrally with each other, and the two may be separate from each other, in which case the two are united together by a known engagement structure, an adhesive or the like.

However, in the case where the housing body portion 11 and the bending guide portion 20 are formed integrally with each other, this is advantageous in that the number of the component parts, as well as the time and labor, required for the assembling operation, is reduced. There is another advantage that the housing body portion 11 and the bending guide portion 20 are prevented from being disengaged from each other, and the optical fiber cord 1 is prevented from being abruptly bent, thereby preventing the increase of the light loss.

In the optical connector 10, the optical fiber cord 1 is positioned and held in the axial direction thereof by the bending guide portion 20.

In this embodiment, stopper insertion hole portions 22 are formed in a curved inner peripheral portion of the bending guide portion 20, and the stopper 33 is inserted into the holding hole portion 21 through the stopper insertion hole portions 22, and is engaged with the sheath 3 of the optical fiber cord 1, thereby positioning and holding the optical fiber cord 1.

More specifically, the pair of stopper insertion hole portions 22 are formed in the curved inner peripheral portion of the bending guide portion 20 at a central portion thereof in the longitudinal direction, and are spaced a predetermined distance from each other in the direction of extending of the bending guide portion 20. Each of the stopper insertion hole portions 22 is in the form of a slit extending in the direction of the width of the bending guide portion 20.

A pair of stopper receiving groove portions 23 are formed in an inner surface of the outer peripheral portion of the bending guide portion 20, and are disposed in opposed relation to the stopper insertion hole portions 22, respectively. The stopper receiving groove portions 23 receive the distal end portions of the stopper 30 to more positively hold the stopper 30 in the predetermined position in the holding hole portion 21.

Figure 3:
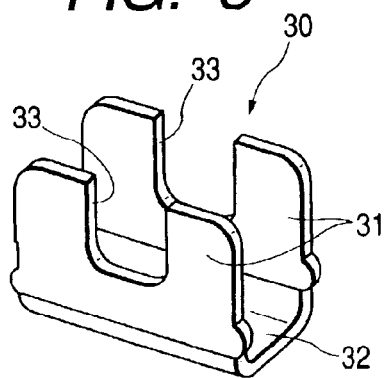
FIG. 3 is a perspective view of a stopper.

As shown in FIGS. 1 and 3, the stopper 30 is formed, for example, by pressing a thin sheet-like member of metal or the like, and the stopper 30 includes a pair of opposed positioning plate portions 31 of a generally square shape which have a predetermined thickness, and are spaced a predetermined distance from each other, and are interconnected by an interconnecting plate portion 32, and the stopper 30 has a generally U-shape when viewed from the side thereof.

A positioning slit 33 of a generally U-shape is formed in each positioning plate portion 31, and is disposed centrally of the width thereof, and is open to a distal end thereof. The width of each positioning slit 33 is smaller than the diameter of the optical fiber cord 1, which is to be positioned, and is larger than the diameter of the optical fiber 2.

When the positioning plate portions 31 are inserted respectively into the stopper insertion hole portions 22, and are received in the holding hole portion 21 as shown in FIG. 1, the interconnecting plate portion 32 is held against the outer surface of the curved inner peripheral portion of the bending guide portion 20, and the distal ends of the positioning plate portions 31 are fitted respectively in the stopper receiving groove portions 23, and in this condition the positioning plate portions 31 of the stopper 30 are positioned and received in the holding hole portion 21.

In this condition, each positioning plate portion 31 is positioned and fixed in the holding hole portion 21 in such a posture that the plane of each positioning plate portion 31 is disposed perpendicular to the bending direction of the bending guide portion 20 (more specifically, perpendicular to the bending direction of the bending guide portion 20 and to a direction tangential to the bending guide portion 20 at the stopper insertion hole portion 22).

In this condition, opposed side edges of each positioning slit 33 of the stopper 30 is held in biting engagement with opposite sides of the sheath 3 of the optical fiber cord 1, respectively, thereby positioning and holding the optical fiber cord 1 in the axial direction thereof.

In the bending guide portion 20, the sheath 3 of the optical fiber cord 1 maybe positioned and fixed in the axial direction thereof by the use of an adhesive or the like.

The procedure of holding the optical fiber cord 1 in the optical connector 10 of the above construction will be described.

First, the sheath 3 is removed over a predetermined length at the end portion of the optical fiber cord 1, so that the optical fiber 2 is exposed over this predetermined length. This optical fiber cord 1 is inserted into the holding hole portion 21 through the open rear end of the bending guide portion 20. Then, the optical fiber cord 1 is moved along the holding hole portion 21, and the optical fiber 2, disposed at the end portion thereof, is inserted into the fiber receiving hole portion 15. In this condition, the positioning plate portions 31 of the stopper 30 are inserted respectively into the stopper insertion hole portions 22, and are positioned and fixed in the holding hole portion 21, so that the opposed side edges of each positioning slit 33 are brought into biting engagement with the opposite sides of the sheath 3 within the holding hole portion 21, thus completing the operation for positioning and holding the optical fiber cord 1.

In the optical connector 10 of the above construction, the optical fiber cord 1 is positioned and held in the axial direction in the bending guide portion 20, and therefore the provision of a cord insertion hole portion as used in the conventional optical connectors is omitted, and the optical connector 10 can be formed into a smaller size.

And besides, the pair of stopper insertion hole portions 22 are formed in the curved inner peripheral portion of the bending guide portion 20, and the stopper 30 is inserted into the stopper insertion hole portions 22, and is positioned and fixed in the holding hole portion 21 in such a manner that the stopper 30 is engaged with the sheath 3 of the optical fiber cord 1. Therefore, by inserting the stopper 30 into the holding hole portion 21 from the curved inner peripheral side of the bending guide portion 20 and by positioning and fixing the stopper 30, the optical fiber cord 1 can be easily positioned and held in the axial direction thereof.

In order to reduce the size of the optical connector 10 as much as possible, it is preferred that the fiber receiving hole portion 15 in the housing body portion 11 be substantially continuous with the holding hole portion 21 in the bending guide portion 20.

More specifically, preferably, the holding hole portion 21 is formed immediately adjacent to the rear end of the fiber receiving hole portion 15 (for receiving the optical fiber 2), with no straight portion formed therebetween.

[Modifications of the First Embodiment]

In this embodiment, although the positioning plate portions 31 of the stopper 30 are inserted respectively in the pair of stopper insertion hole portions 22 so as to more positively position and hold the optical fiber cord 1, the number of the stopper insertion holes 22, as well as the number of the positioning plate portions 31, may be one or may be three or more.

In this embodiment, although the bending guide portion 20 holds the optical fiber cord 1 in such a bent manner that the optical fiber cord 1 extends outwardly from the bending guide portion in a direction disposed at an angle of about 90 degrees relative to the fiber receiving hole portion 15, the direction of extending of the optical fiber cord 1 outwardly from the bending guide portion, as well as the bent form thereof, may be suitably changed, for example, in accordance with the site where the optical connector 10 is used.

In this embodiment, the stopper insertion hole portions 22 are formed in the curved inner peripheral portion of the bending guide portion 20 at the central portion thereof in the longitudinal direction, the position where the stopper insertion hole portions 22 are formed is not limited to this portion.

Figure 4:
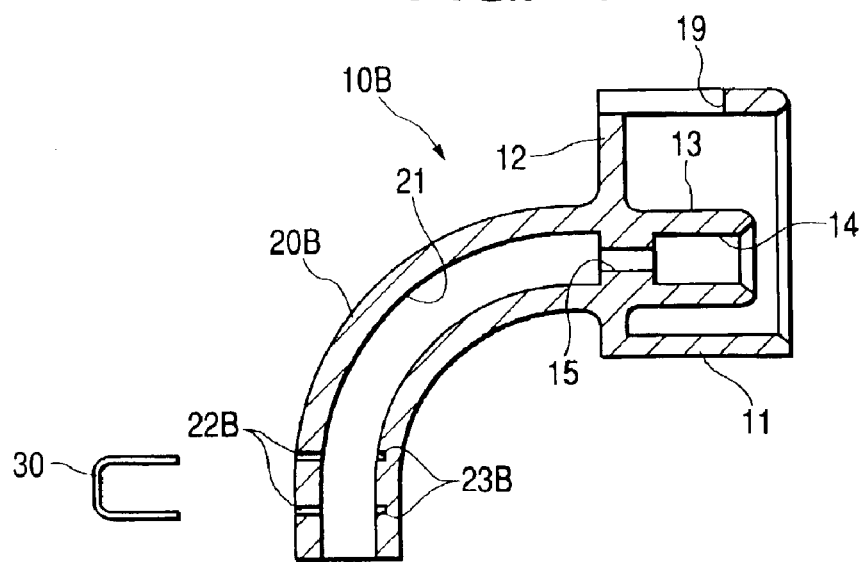
FIG. 4 is a cross-sectional view of a modified optical connector (modified example 1)

For example, in a modified optical connector 10B (modified example 1) shown in FIG. 4, a pair of stopper insertion hole portions 22B (corresponding to the stopper insertion hole portions 22) are formed in an outer peripheral portion of a bending guide portion 20B (corresponding to the bending guide portion 20) at a rear end portion thereof, and stopper receiving groove portions 23B (corresponding to the stopper receiving groove portions 23) are formed in an inner surface of an inner peripheral portion of the bending guide portion, and are disposed in opposed relation to the stopper insertion hole portions, respectively. The optical fiber cord 1 is positioned and held by the stopper 30 at the rear end portion of the bending guide portion 20B.

The stopper insertion hole portions 22, as well as the stopper receiving groove portions 23, maybe formed at the front end portion of the bending guide portion 20 (disposed close to the housing body portion 11), or may be formed in one side portion or the other side portion of the bending guide portion, or may be provided at a plurality of portions of the bending guide portion. Here, the one side portion and the other side portion of the bending guide portion 20 are those portions intersecting a curved surface curved along the bent axis of the bending guide portion 20, that is, those portions interconnecting the curved inner and outer peripheral portions of the bending guide portion 20.

In this embodiment, although the bending guide portion 20 is formed into a generally tubular shape, and has the holding hole portion 21 formed therein, the outer peripheral portion, the one side portion or the other side portion of the bending guide portion 20 may be open, so that a holding groove portion of a generally U-shaped cross-section is formed in the bending guide portion.

Figure 5:
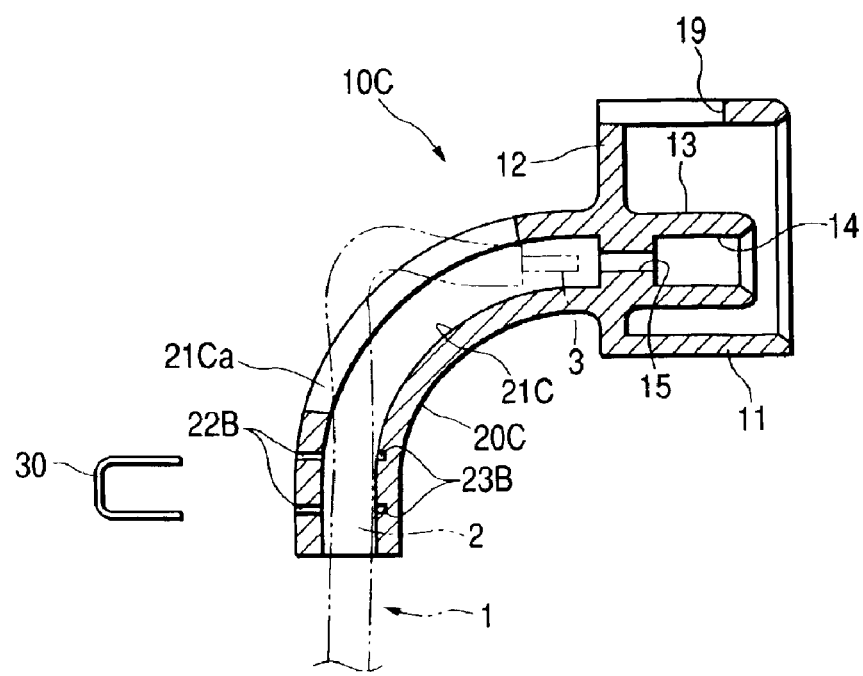
FIG. 5 is a cross-sectional view of a modified optical connector (modified example 2)
Figure 6A:
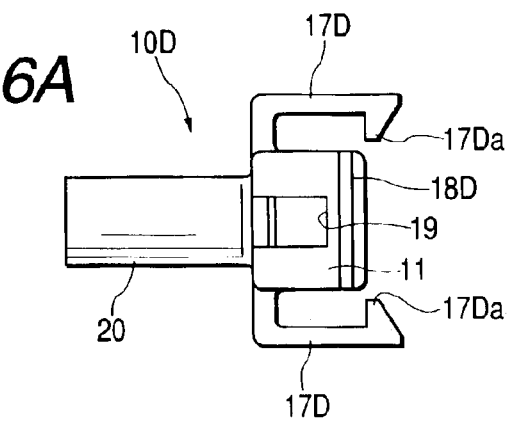
FIG. 6A is a plan view of a second embodiment of an optical connector of the invention.
Figure 6B:
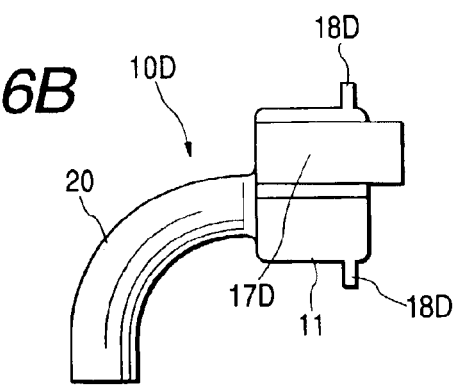
FIG. 6B is a side-elevation view of the optical connector.
Figure 6D:
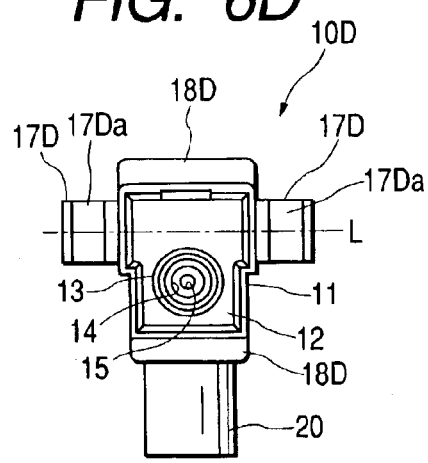
FIG. 6D is a front-elevation view of the optical connector.
Figure 6C:
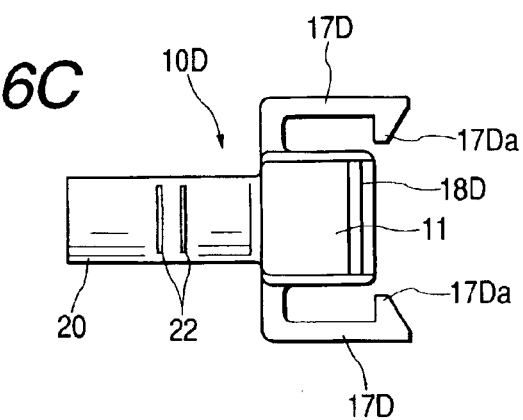
FIG. 6C is a rear view of the optical connector.
Figure 7:
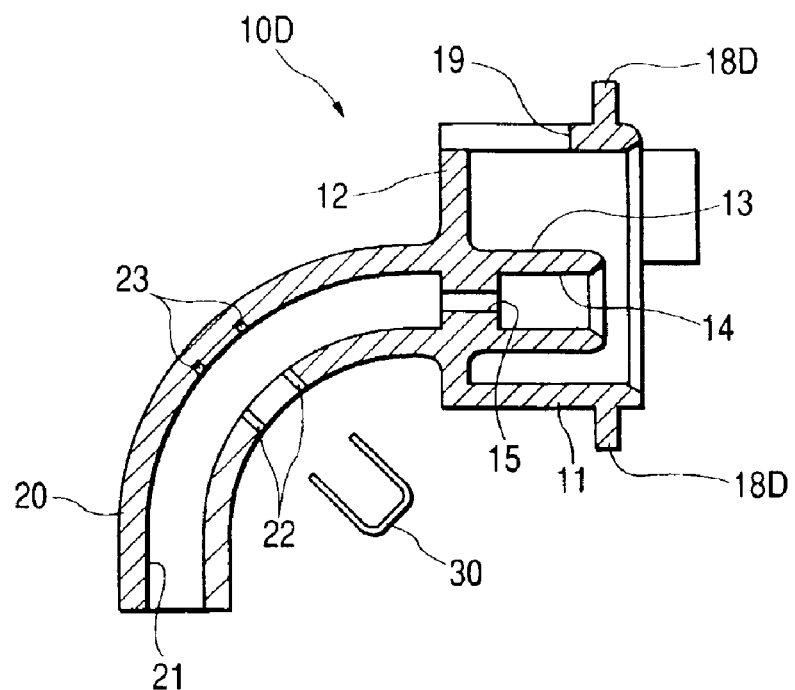
FIG. 7 is a cross-sectional view of the above optical connector.

For example, in a modified optical connector 10C (modified example 2) shown in FIG. 5, an opening 20Ca is formed in an outer peripheral portion of a bending guide portion 20C (corresponding to the bending guide portion 20), and extends over a predetermined length intermediate opposite ends thereof. Preferably, this opening 20Ca is open on a line of extension of the direction of inserting of the optical fiber 2 into the fiber receiving hole portion 15.

In this modified example 2, a pair of stopper insertion hole portions 22B and a pair of stopper receiving portions 23B are formed in the bending guide portion in the same manner as described above for the modified example 1.

In this modified example 2, the operation for holding the optical fiber cord 1 is effected in the following manner.

First, the end portion of the optical fiber cord 1 is inserted into a holding hole portion 21C (corresponding to the holding hole portion 21) through an open rear end thereof (lower end in FIG. 2), and is once extended outwardly from the bending guide portion through the opening 20Ca.

Then, the end portion of the optical fiber cord 1 is again inserted into the holding hole portion 21C through the opening 20Ca, and the optical fiber 2, disposed at the end portion of the optical fiber cord 1, is inserted into the fiber receiving hole portion 15 (see chain double dashed lines in FIG. 5).

Finally, when that portion of the optical fiber cord 1, extending outwardly (downwardly) from the distal end of the bending guide portion 20C, is pulled, the optical fiber cord 1 is received in the holding hole portion 21C.

Then, the optical fiber cord 1 is positioned and fixed in the axial direction thereof by the use of the stopper 30 as described above for the modified example 1, thus completing the operation for holding the optical fiber cord 1.

In this modified example 2, the optical fiber cord 1 is once extended outwardly through the opening 20Ca, and in this condition the optical fiber 2, disposed at the end portion of the optical fiber cord 1, can be inserted into the fiber receiving hole portion 15, and therefore there is achieved an advantage that this inserting operation can be effected easily.

In this embodiment, the present invention is applied not to the optical connector 50 but to the optical connector 10, and the reason for this will be described below.

Namely, the optical connector 10 and the optical connector 50 are connected together, and the optical connector 50 is provided with the engagement extension piece portion 57 with the engagement projection 58 for maintaining this connected condition. Therefore, with respect to the optical connector 50, a compact design is limited because of the provision of this engagement extension piece portion 57. On the other hand, only the engagement hole portion 19 of a relatively compact construction is provided at the optical connector 10, and therefore a limitation of the compact design is small. Therefore, in this embodiment, the present invention is applied to the optical connector 10 of which compact design is less limited.

However, in the case where the limitation of the compact design is small (for example, the construction of maintaining the connected condition of the optical connectors 10 and 50 can be made more compact), the present invention can be applied to the optical connector 50 having the ferrule portion 55.

Although this embodiment is directed to the optical connector 10 of the single-pole type, the present invention can be applied to an optical connector of the multi-pole type.

[Second Embodiment]

Next, a second embodiment of an optical connector 10D of the invention will be described with reference to FIGS. 6A to 6D, 7 and 8.

In the description of the optical connector 10D, those constituent elements, identical to those of the first embodiment, will be designated by identical reference numerals, respectively, and explanation thereof will be omitted.

This optical connector 10D differs from the optical connector 10 in that there is added a construction for mounting the optical connector on a plate-like mounting member to which the optical connector is to be mounted. Here, a plate-like mounting member X, such as a body of an automobile, is used as this plate-like mounting member, and a pair of retaining holes Xa are formed in the plate-like mounting member X (see FIG. 8).

More specifically, in this optical connector 10D, two lock arm portions 17D and two positioning projections 18D are formed on a housing body portion 11.

Each lock arm portion 17D has a retaining projection 17Da which is passed through the retaining hole Xa, and is engaged with one side (right side in FIG. 8) of the plate-like mounting member X.

More specifically, each of the lock arm portions 17D of a generally L-shape projects from an outer peripheral surface of the housing body portion 11, and extends forwardly, and the inwardly-directed retaining projection 17Da is formed at a distal end of the lock arm portion.

Figure 8:
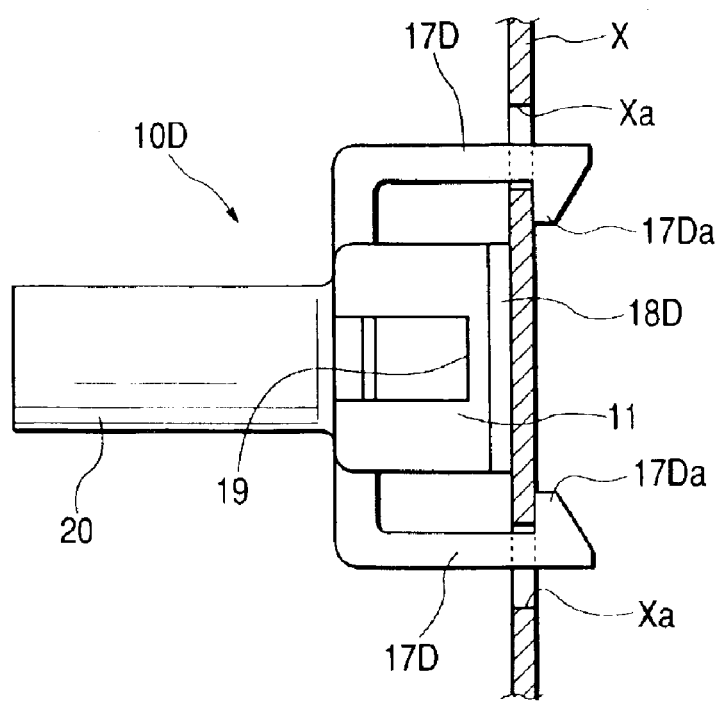
FIG. 8 is a partly-cross-sectional, plan view showing a condition in which the above optical connector is mounted on a plate-like mounting member.
Figure 10:
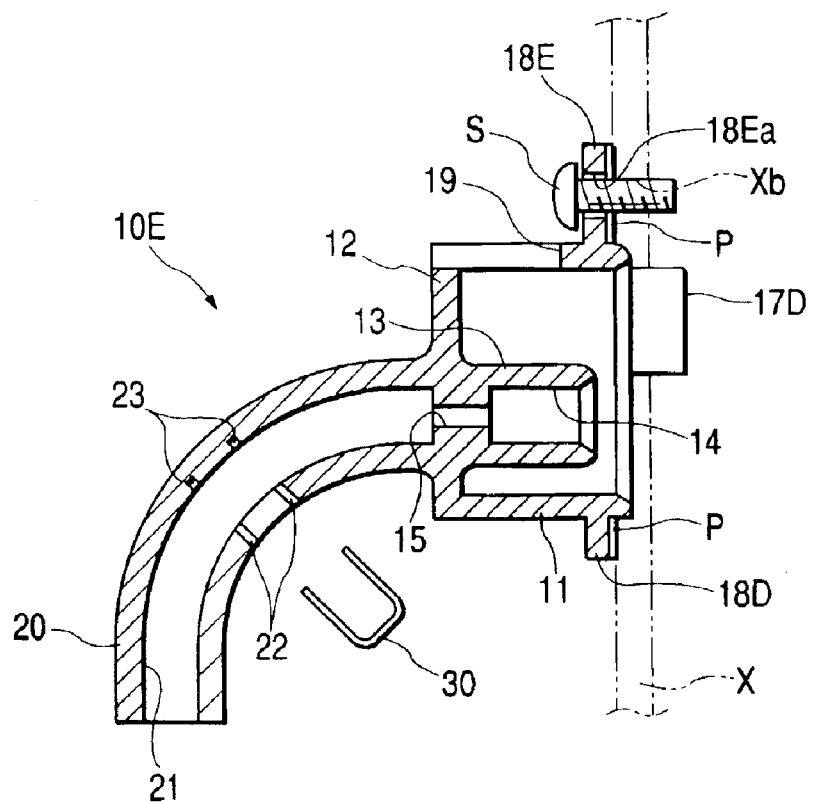
FIG. 10 is a cross-sectional view of the above optical connector.
Figure 11:
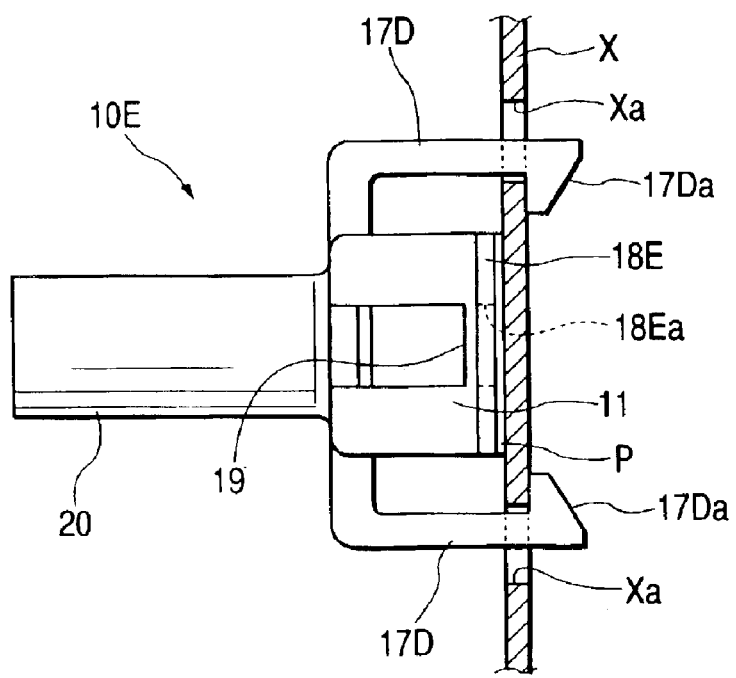
FIG. 11 is partly-cross-sectional, plan view showing a condition in which the above optical connector is mounted on a plate-like mounting member.

The positioning projections 18D are so formed as to engage with the plate-like mounting member X from the other side thereof (left side in FIG. 8).

More specifically, each positioning projection 18D is in the form of a small plate-like piece, and projects outwardly from the outer peripheral surface of the housing body portion 11.

The lock arm portions 17D and the positioning projections 18D project from the outer peripheral surface of the housing body portion 11 in different directions, respectively.

In this embodiment, the lock arm portions 17D are formed on and project from the upper and lower sides of the housing body portion 11, respectively, and the positioning projections 18D are formed on and project from the opposite sides of the housing body portion 11, respectively.

Referring to the relation with a bending guide portion 20, the bending guide portion 20 holds an optical fiber cord 1 in such manner that the optical fiber cord 1 is extended outwardly from this bending guide portion in a direction substantially perpendicular to an imaginary line L interconnecting the pair of lock arm portions 17D.

The distal ends of the lock arm portions 17D are pushed respectively into the retaining holes Xa from the other side of the plate-like mounting member X, and the retaining projection 17Da of each lock arm portion 17D is engaged with the one side of the plate-like mounting member X at a peripheral edge portion of the retaining hole Xa, while the positioning projections 18D are engaged with the other side of the plate-like mounting member X. As a result, the optical connector 10D is mounted on the plate-like mounting member X, with the plate-like mounting member X held between the retaining projections 17Da and the positioning projections 18D.

In this condition, the front side of the housing body portion 11 is exposed to the one side of the plate-like mounting member X through an opening (not shown) formed through this plate-like mounting member X. Then, a mating optical connector 50 is connected to the optical connector 10D from the one side of the mounting member X.

In the optical connector 10D of the above construction, the mounting of this optical connector 10D can be easily effected by pushing the distal end of each lock arm portion 17D into the retaining hole Xa from the other side of the plate-like mounting member X. This construction is effective particularly when only a narrow space is available for effecting the mounting of the optical connector 10D.

The lock arm portions 17D and the positioning projections 18D project from the outer peripheral surface of the housing body portion 11 in the different directions, respectively, and therefore when the optical connector is mounted on the plate-like mounting member X, the retaining projections 17Da of the lock arm portions 17D and the positioning projections 18D are retainingly engaged with the different portions of the plate-like mounting member X, respectively, and therefore a shaking movement of the optical connector 10D can be effectively prevented.

The bending guide portion 20 holds the optical fiber cord 1 in such manner that the optical fiber cord 1 is extended outwardly from this bending guide portion in the direction substantially perpendicular to the imaginary line L interconnecting the pair of lock arm portions 17D, and therefore even when a pulling force is applied to the optical fiber cord 1 in the condition in which the optical connector is mounted on the plate-like mounting member X, this force can be received by the lock arm portions 17D. Therefore, the retaining engagement of the retaining projection 17Da of each lock arm portion 17D with the retaining hole Xa in the plate-like mounting member X is less liable to be canceled, and therefore the strength of mounting of the optical connector 10D is excellent.

In this embodiment, although there provided the two lock arm portions 17D and the two positioning projections 18D, the number of the lock arm portions, as well as the number of the positioning projections, may be one or may be three or more. Preferably, the number of these portions may be two or more in order to fix the optical connector without a shaking movement.

The modified examples, described above in connection with the first embodiment, can be applied also to this second embodiment.

[Third Embodiment]

Next, a third embodiment of an optical connector 10E of the invention will be described with reference to FIGS. 9A to 9D, FIG. 10 and FIG. 11.

In the description of the optical connector 10E, those constituent elements, identical to those of the second embodiment, will be designated by identical reference numerals, respectively, and explanation thereof will be omitted.

This optical connector 10E differs from the optical connector 10D in that a screw passage hole 18Ea (serving as a screw fastening hole) is formed in at least one of the positioning projections 18D (here, the positioning projection 18D formed on the upper surface of the housing body portion 11), and therefore there is provided the positioning projection 18E with the screw passage hole 18Ea.

The positioning projection 18E with the screw passage hole 18Ea projects in a direction (upwardly) away from a direction (downward direction) of extending of the optical fiber cord 1 outwardly from a bending guide portion 20.

An elastic member P is mounted on each of the positioning projections 18D and 18E such that the elastic member P is interposed between the positioning projection 18D, 18E and the other side of a plate-like mounting member X. A sheet-like member, made of a urethane resin, rubber or the like, can be used as the elastic member P. Preferably, the elastic members P are bonded respectively to front surfaces of the positioning projections 18D and 18 by an adhesive or the like in order to prevent the disengagement of these elastic members P.

This optical connector 10E is mounted on the plate-like mounting member X in a similar manner as described above for the second embodiment, and in this condition a screw S is passed through the screw passage hole 18Ea in the positioning projection 18E, and is threaded into a screw hole Xb in the plate-like mounting member X.

There may be adopted a construction in which a hole for passing the screws there through is formed through the plate-like mounting member X while a screw hole, into which the screw can be threaded, is formed in the positioning projection 18E, and the screw S is threaded into this screw hole, from the one side of the plate-like mounting member X, thereby providing the screw-fastening structure.

In the optical connector 10E of the above construction, there are provided the elastic members P each interposed between the corresponding positioning projection 18D, 18E and the other side of the plate-like mounting member X, and therefore a shaking movement of the optical connector 10E is prevented when this optical connector is mounted on the plate-like mounting member X.

And besides, the positioning projection 18E with the screw passage hole 18Ea projects in the direction (upwardly) away from the direction (downward direction) of extending of the optical fiber cord 1 outwardly from the bending guide portion 20, and therefore even when a pulling force is applied to the optical fiber cord 1 in the condition in which the optical connector is mounted on the plate-like mounting member X, this force can be received by the screw-fastening portions of the positioning projection 18E (having the screw passage hole 18Ea) and plate-like mounting member X. Therefore, the strength of mounting of the optical connector 10E is excellent.

The modified examples, described above in connection with the first and second embodiments, can be applied also to this third embodiment.

The elastic members P, described in this embodiment, can be used in the optical connector 10D of the second embodiment.

As described above, in the optical connector according to the invention, the optical fiber cord is positioned and held in the axial direction thereof by the bending guide portion, and therefore the provision of a cord insertion hole portion as provided in the conventional optical connectors can be omitted, and the optical connector can be formed into a compact size.

According to the invention, the stopper is inserted into the holding hole portion or the holding groove portion through the stopper insertion hole portion, and is engaged with the sheath of the optical fiber cord, and by doing so, the optical fiber cord can be positioned and held in the axial direction thereof.

According to the invention, the holding hole portion or the holding groove portion is substantially continuous with the fiber receiving hole portion, and therefore the compact design of the optical connector can be achieved.

According to the invention, the housing body portion and the bending guide portion are formed integrally with each other, and therefore the number of the component parts of the optical connector, as well as the time and labor, required for the assembling operation, can be reduced. And besides, the housing body portion and the bending guide portion can be prevented from being disengaged from each other.

In the structure of holding an optical fiber cord according to the invention, the optical fiber cord is positioned and held in the axial direction thereof by the bending guide portion, and therefore the provision of a cord insertion hole portion as provided in the conventional optical connectors can be omitted, and the optical connector can be formed into a compact size.

In the optical connector according to the invention, the lock arm portion is pushed into the retaining hole formed through the plate-like mounting member, and the retaining projection of the lock arm portion and the positioning projection are engaged with the plate-like mounting member, and by doing so, the optical connector can be easily mounted on the plate-like mounting member.

According to the invention, the lock arm portion and the positioning projection project from the outer peripheral surface of the housing body portion in the different directions, respectively, and therefore when the optical connector is mounted on the plate-like mounting member, the retaining projection of the lock arm portion and the positioning projection are retainingly engaged with the different portions of the plate-like mounting member, respectively. Therefore, when the optical connector is mounted on the plate-like mounting member, a shaking movement of the optical connector is prevented.

According to the invention, the bending guide portion holds the optical fiber cord in such manner that the optical fiber cord is extended outwardly from the bending guide portion in the direction substantially perpendicular to the imaginary line interconnecting the pair of lock arm portions. In this case, even when a pulling force is applied to the optical fiber cord in the condition in which the optical connector is mounted on the plate-like mounting member, this force can be received by the two lock arm portions. Therefore, the retaining engagement of the retaining projection of each lock arm portion with the retaining hole in the plate-like mounting member is less liable to be canceled, and therefore the strength of mounting of the optical connector is excellent.

According to the invention, the elastic member is mounted on the positioning projection such that the elastic member is interposed between the positioning projection and the other side of the plate-like mounting member. With this construction, when the optical connector is mounted on the plate-like mounting member, a shaking movement of the optical connector is prevented.

According to the invention, the positioning projection with the screw fastening hole projects in the direction away from the direction of extending of the optical fiber cord outwardly from the bending guide portion, and therefore even when a pulling force is applied to the optical fiber cord in the condition in which the optical connector is mounted on the plate-like mounting member, this force can be received by the screw-fastening portions of the positioning projection (having the screw fastening hole) and plate-like mounting member. Therefore, the strength of mounting of the optical connector is excellent.

What is claimed is:
1. An optical connector comprising:
 a housing body portion having a fiber receiving hole portion for receiving an optical fiber exposed at an end portion of an optical fiber cord, the housing body portion to be connected to a mating optical connector, the optical fiber cord extending rearward from the fiber receiving hole portion; and a bending guide portion extending rearward from the housing body portion and having a holding portion for holding the optical fiber cord in a predetermined curved manner;

wherein:

the optical fiber cord is positioned and held in an axial direction thereof in the bending guide portion;

the housing body portion includes a lock arm portion and a positioning projection;

the lock arm portion passes through a retaining hole formed in a plate to which the optical connector is to be mounted;

the lock arm portion has a retaining projection which retainingly engages with one side of the plate; and the positioning projection is retainingly engaged with the other side of the plate.

2. The optical connector according to claim 1, further comprising:

a stopper for holding the optical fiber cord in the axial direction; wherein a stopper insertion hole portion is formed in the bending guide portion; and the stopper is inserted into the holding portion through the stopper insertion hole portion such that the stopper is engaged with a sheath of the optical fiber cord in the holding portion.

3. The optical connector according to claim 1, wherein the holding portion is substantially continuous with the fiber receiving hole portion.

4. The optical connector according to claim 1, wherein the housing body portion and the bending guide portion are formed integrally with each other.

5. The optical connector according to claim 2, wherein the bending guide portion has a curved shape; and the stopper insertion hole is formed in one of an inner peripheral portion, an outer peripheral portion and opposite side portions of the curved shape.

6. The optical connector according to claim 1, wherein the holding portion includes a holding hole portion or a holding groove portion.

7. The optical connector according to claim 1, wherein the lock arm portion and the positioning projection project from an outer peripheral surface of the housing body portion in different directions, respectively.

8. The optical connector according to claim 1, wherein the housing body portion has a pair of the lock arm portions, each formed on opposite side surfaces of the housing body portion respectively; and the bending guide portion holds the optical fiber cord such that the optical fiber cord is extended outwardly from the bending guide portion in a direction substantially perpendicular to an imaginary line interconnecting the pair of lock arm portions.

9. The optical connector according to claim 1, wherein an elastic member is mounted on the positioning projection such that the elastic member is interposed between the positioning projection and the other side of the plate.

10. The optical connector according to claim 1, wherein the positioning projection has a screw fastening hole for screw-fastening the positioning projection to the plate; and the positioning projection with the screw fastening hole projects in a direction away from a direction of extending of the optical fiber cord from the bending guide portion.

11. A structure of holding an optical fiber cord in an optical connector, wherein the optical connector comprises:

a housing body portion having a fiber receiving hole portion for receiving an optical fiber exposed at an end portion of the optical fiber cord, the structure comprising:

a bending guide portion extending rearward from the housing body portion, for holding the optical fiber cord in a predetermined curved manner; wherein:

the optical fiber cord is positioned and held in an axial direction thereof in the bending guide portion;

the housing body portion includes a lock arm portion and a positioning projection;

the lock arm portion passes through a retaining hole formed in a plate, the plate to which the optical connector is to be mounted;

the lock arm portion has a retaining projection which retainingly engages with one side of the plate; and the positioning projection is retainingly engaged with the other side of said plate.

12. The structure of holding an optical fiber cord in an optical connector according to claim 11, further comprising:

a stopper for holding the optical fiber cord in the axial direction; wherein a stopper insertion hole portion is formed in the bending guide portion; and the stopper is inserted into the holding portion through the stopper insertion hole portion such that the stopper is engaged with a sheath of the optical fiber cord in the holding portion.

13. The structure of holding an optical fiber cord in an optical connector according to claim 11, wherein the holding portion is substantially continuous with the fiber receiving hole portion.

* * * * *